No. 782,566. PATENTED FEB. 14, 1905.
C. H. KNICKERBOCKER.
CATTLE STANCHION.
APPLICATION FILED MAY 31, 1904.
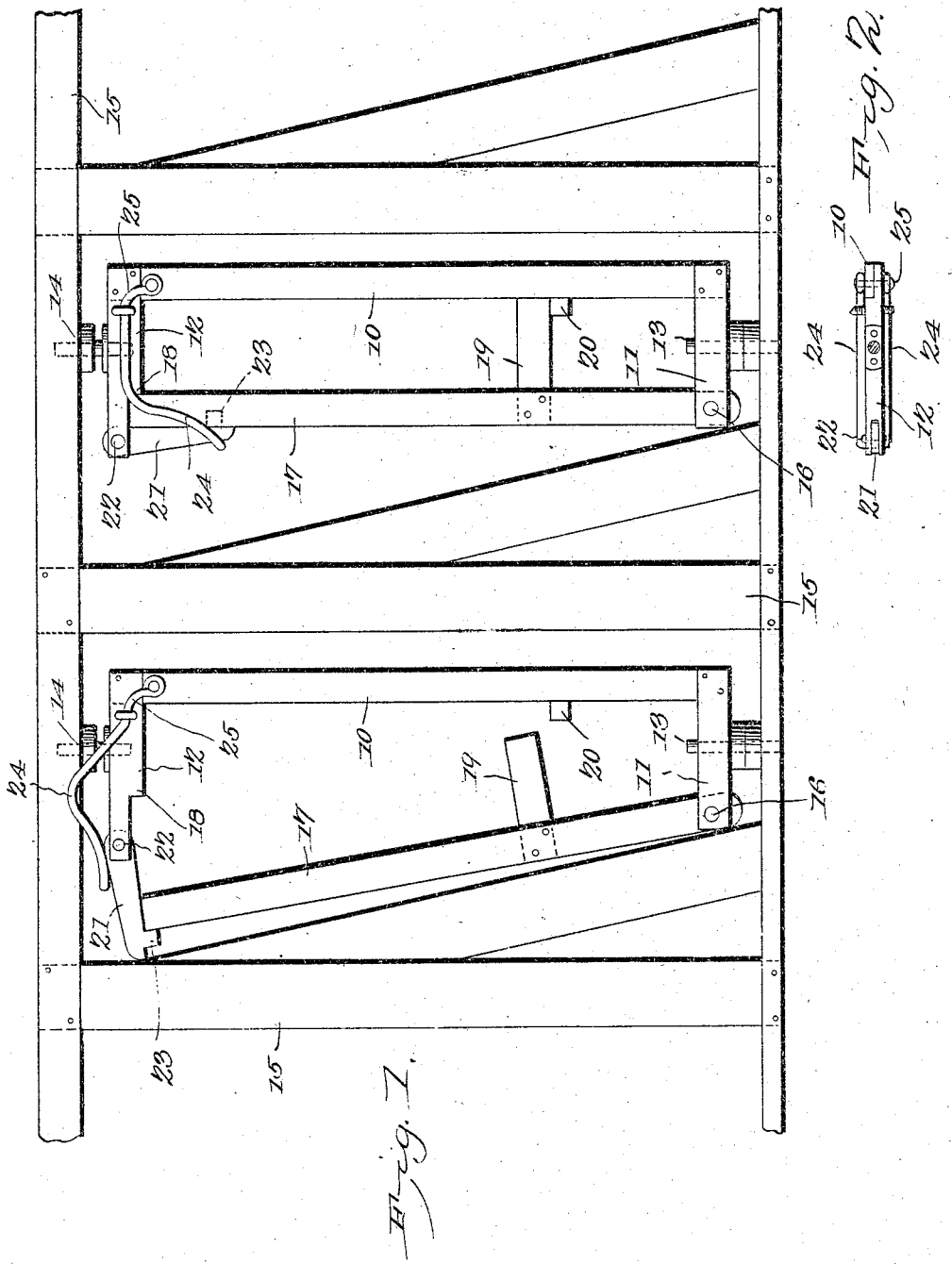
Charles H. Knickerbocker, Inventor
Witnesses
E. H. Stewart
C. N. Woodward.
by C. A. Snow & Co
Attorneys No. 782,566. Patented February 14, 1905.

UNITED STATES PATENT OFFICE.

CHARLES H. KNICKERBOCKER, OF CROSSFORK, PENNSYLVANIA, ASSIGNOR OF ONE-HALF TO CHARLES POLLARD, OF CROSSFORK, PENNSYLVANIA.

CATTLE-STANCHION.

SPECIFICATION forming part of Letters Patent No. 782,566, dated February 14, 1905.

Application filed May 31, 1904. Serial No. 210,548.

*To all whom it may concern:*

Be it known that I, CHARLES H. KNICKERBOCKER, a citizen of the United States, residing at Crossfork, in the county of Potter and State of Pennsylvania, have invented a new and useful Cattle-Stanchion, of which the following is a specification.

This invention relates to cattle-stanchions, and has for its object to simplify and improve the construction and produce a device of this character inexpensive to manufacture, easily operated, and in which the movements of the entering animals are utilized to close and lock the same.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a side elevation of two of the improved stanchions, one open and one closed. Fig. 2 is a plan view of the improved device removed from its supporting-frame.

The improved device comprises a stationary member formed of a vertical bar 10, lateral base-bar 11, and lateral head-bar 12, the head-bar and base-bar being preferably pivoted, respectively, at 13 and 14 in the usual supporting-framework 15.

Pivoted at 16 in the free end of the base-bar 11 is a movable member 17 and adapted when closed to abut against a stop 18 on the lower surface of the head-bar 12.

Rigidly attached to the movable member 17 is an arm 19, extending toward and nearly reaching the vertical bar 10 and resting upon a block 20 upon the stationary member.

The head member 12 extends beyond the free end of the movable member 17 when the latter is closed and is provided with a lever-arm 21, pivoted at 22 therein and swinging into the path of the member 17 and resting against its outer side when the same is closed, as at the right in Fig. 1, and then when the movable member is distended the lever-arm rests upon its free end, which is limited in its outward movement by a stop 23 on the lever.

A spring 24 of elongated-U shape is connected by the terminals of its leg members at 25 to the opposite sides of the upper end of the bar 10 and embraces the lever 21 by its looped end and exerts its force to control the lever-arm.

By this arrangement it will be obvious that when the lever-arm 21 is in its downward position, as at the right in Fig. 1, pressure from within will not release the bar 17, but its release can be accomplished only by manually moving the lower or free end of the lever 21 outward and upward against the force of the spring 24 until the free end of the bar 17 engages the stop 23, when the animal can remove its head. The device remains in this open position until the animal again inserts its head at feeding time, when a comparatively slight pressure of the throat and breast upon the rigid arm 19 will throw the bar 17 over, release the spring 24, and automatically lock the bar to the member 12, as before.

The device is very simple in construction, can be inexpensively manufactured and erected in any locality where ordinary stanchions are used, and will be found very convenient and efficient for the purposes described.

Having thus described the invention, what is claimed is—

1. In a cattle-stanchion, a movable member having a laterally-extending rigid arm, and a supporting member having automatic means for engaging said movable member when the same is actuated by the contact of the entering animal with the rigid arm extending therefrom.

2. In a cattle-stanchion, a movable member having a laterally-extending rigid arm, a supporting member having a spring-controlled lever-arm extending into the path of the free end of said movable member and adapted to hold the same yieldably in distended position and releasable by the contact of the entering animal with said rigid arm extending from the same.

3. In a cattle-stanchion, a supporting member formed of a vertical bar having laterally-extending base and head bars, a movable member pivoted in said base-bar and detachably engaging said head-bar and provided with a rigid arm extending laterally therefrom and terminating adjacent to said vertical bar, a spring-controlled lever-arm swinging from said head-bar into the path of the free end of said movable member and adapted to support the same in distended position, and releasable by pressure imparted to said rigid arm.

4. In a cattle-stanchion, a movable member having a laterally-extending rigid arm, a supporting member having a lever-arm swinging therefrom into the path of the movable member and adapted to hold the same yieldably in distended position, and a spring substantially in elongated-U shape connected by its ends to said supporting member and embracing said lever-arm by its looped end.

5. In a cattle-stanchion, a movable member having a laterally-extending rigid arm, and a supporting member mounted to swing horizontally and having automatic means for engaging said movable member when the same is actuated by the contact of the entering animal with the rigid arm extending therefrom.

In testimony that I claim the foregoing as my own I have hereto affixed my signature in the presence of two witnesses.

CHAS. H. KNICKERBOCKER.

Witnesses:
Mrs. E. A. KNICKERBOCKER,
W. H. MATTISON.